United States Patent
Takenaka et al.

(10) Patent No.: US 8,144,199 B2
(45) Date of Patent: Mar. 27, 2012

(54) MOVING OBJECT AUTOMATIC TRACKING APPARATUS

(75) Inventors: Shinji Takenaka, Ishikawa (JP);
Yasuyuki Michimoto, Ishikawa (JP);
Satoru Oyabu, Kanagawa (JP)

(73) Assignee: Panasonic Corporation, Osaka (JP)

( * ) Notice: Subject to any disclaimer, the term of this patent is extended or adjusted under 35 U.S.C. 154(b) by 440 days.

(21) Appl. No.: 12/374,752

(22) PCT Filed: Sep. 21, 2007

(86) PCT No.: PCT/JP2007/068465
§ 371 (c)(1),
(2), (4) Date: Jan. 22, 2009

(87) PCT Pub. No.: WO2008/038606
PCT Pub. Date: Apr. 3, 2008

(65) Prior Publication Data
US 2010/0002083 A1    Jan. 7, 2010

(30) Foreign Application Priority Data
Sep. 25, 2006 (JP) .................................. 2006-258830

(51) Int. Cl.
*H04N 5/225* (2006.01)
(52) U.S. Cl. ........................................ 348/169; 382/103
(58) Field of Classification Search ................... 348/169
See application file for complete search history.

(56) References Cited

U.S. PATENT DOCUMENTS

| | | | | |
|---|---|---|---|---|
| 6,507,366 B1 * | 1/2003 | Lee | .............................. | 348/352 |
| 2003/0035051 A1 * | 2/2003 | Cho et al. | ..................... | 348/169 |
| 2005/0073585 A1 * | 4/2005 | Ettinger et al. | ............... | 348/155 |
| 2005/0275721 A1 * | 12/2005 | Ishii | .............................. | 348/159 |
| 2006/0244866 A1 * | 11/2006 | Kishida | ......................... | 348/699 |

FOREIGN PATENT DOCUMENTS

| | | |
|---|---|---|
| JP | 09-186927 | 7/1997 |
| JP | 2000-322582 | 11/2000 |
| JP | 2001-076156 | 3/2001 |
| JP | 2001-177822 | 6/2001 |
| JP | 2004-260496 | 9/2004 |
| JP | 2006-013888 | 1/2006 |
| JP | 2006-129218 | 5/2006 |
| JP | 2006-148260 | 6/2006 |

OTHER PUBLICATIONS

International Search Report, Jan. 22, 2009.

* cited by examiner

*Primary Examiner* — Abdullahi Salad
(74) *Attorney, Agent, or Firm* — Pearne & Gordon LLP

(57) ABSTRACT

Disclosed is a moving object automatic tracking apparatus that includes a movement detector for detecting movement of a moving object from an image obtained in time series from an image input portion. A tracker tracks the moving object by controlling a platform of the image input portion in a direction of movement of the moving object based on a movement detection result of the movement detector. An area manager manages a registered preset position and new registration of a preset position indicating an area for executing tracking by the tracker and movement detection by the movement detector. A patrol monitor conducts monitoring while patrolling plural preset positions set and managed by the area manager, and when a position in which the moving object is tracked and lost differs from the initialized preset position, the lost position is newly added and registered as an adaptive preset position.

10 Claims, 4 Drawing Sheets

MOVING OBJECT AUTOMATIC TRACKING APPARATUS

TECHNICAL FIELD

The present invention relates to a moving object automatic tracking apparatus which is used for monitoring applications etc. and has a function of detecting a moving object and automatically tracking the moving object.

BACKGROUND ART

As a conventional moving object automatic tracking apparatus, the apparatus described in, for example, Patent Reference 1 has been known. FIG. 4 is a block diagram showing a configuration example of the conventional moving object automatic tracking apparatus. A moving object automatic tracking apparatus 4 of FIG. 4 is configured to comprise a movement detector 41 which is connected to an image input portion 5 which is an imager and detects a moving object from an image obtained from the image input portion 5, a tracker 42 for tracking the moving object imaged by the image input portion 5 based on information about the moving object obtained by this movement detector 41, and a patrol monitor 43 for driving an imaging region of the image input portion 5 to the next monitoring area.

The moving object automatic tracking apparatus 4 of this conventional example implements an automatic tracker for automatically tracking a moving object so as not to fade out the moving object from an imaging screen by driving the image input portion 5 by the patrol monitor 43 based on a detection result obtained by the tracker 42 and the movement detector 41. At this time, plural preset positions which are an area for detecting the moving object are previously registered as initial registration and control is performed so as to turn the imager of the image input portion 5 in each of the registered preset positions and the preset positions are monitored in a patrol manner and thereby, wide monitoring can be performed.

Patent Reference 1: JP-A-2000-322582

DISCLOSURE OF THE INVENTION

Problems that the Invention is to Solve

The moving object automatic tracking apparatus of the conventional example described above is constructed so that only the initially registered preset positions are patrolled and monitored and only a moving object detected in the preset positions is detected and tracking is started. As a result of this, there was a problem that when a moving object intrudes into an area other than the initially registered preset positions, its moving object cannot be detected and tracked.

The invention has been implemented in view of the circumstances described above, and an object of the invention is to provide a moving object automatic tracking apparatus capable of detecting and tracking movement of a moving object even when the moving object intrudes into an area other than an initially registered preset position.

Means for Solving the Problems

A moving object automatic tracking apparatus of the invention comprises:

a movement detector which detects movement of a moving object in an image obtained from an image input portion capable of controlling a photography direction;

a tracker which tracks the moving object by controlling the photography direction of the image input portion in a direction of movement of the moving object based on a detection result of the movement detector;

an area manager which adaptively registers a preset position, and manages a registered preset position, the present position indicating an area for performing tracking and movement detection of the moving object; and a patrol monitor for patrolling and monitoring the preset position.

Consequently, by adaptively registering a preset position according to a tracking situation of a moving object, even when the moving object intrudes into an area other than an initially registered preset position, movement of the moving object can be detected and tracked when its area is an adaptive preset position registered later.

In the invention, in the moving object automatic tracking apparatus described above, the area manager registers a peripheral area including a lost position of tracking as the adaptive preset position when the moving object moves to an area other than the initially registered preset position and is tracked and lost.

Consequently, by registering a position lost and tracked in an area other than a preset position as an adaptive preset position, even when a moving object intrudes into an area other than an initially registered preset position, movement of the moving object can be detected and tracked in the adaptive preset position.

In the invention, in the moving object automatic tracking apparatus described above, the area manager deregisters the adaptive preset position when the moving object is not detected in an area of the adaptive preset position even when a predetermined time has elapsed after the adaptive preset position is registered.

Consequently, when a moving object is not detected even when a predetermined time has elapsed after registration, the preset position of patrol monitoring can properly be managed by deregistering the adaptive preset position.

In the invention, in the moving object automatic tracking apparatus described above, the area manager sets a preset disapproval area where the adaptive preset position cannot be set, and manages registration of the preset position.

Consequently, an area etc. in which movement cannot be detected due to influence such as noise can be set so as not to be registered as an adaptive preset position, and false detection can be reduced.

In the invention, in the moving object automatic tracking apparatus described above, the patrol monitor includes a patrol order setting portion for setting and changing order of performing patrol monitoring.

Consequently, for example, a locus of detection of a moving object detected is traced, or a ratio at which all the preset positions are monitored is equalized, or a place with large movement detection is monitored intensively, and proper monitoring of the moving object according to a situation of an area targeted for monitoring can be performed.

Advantage of the Invention

According to the invention, a moving object automatic tracking apparatus capable of detecting and tracking movement of a moving object even when the moving object intrudes into an area other than an initially registered preset position can be provided.

DESCRIPTION OF REFERENCE NUMERALS AND SIGNS

1 MOVING OBJECT AUTOMATIC TRACKING APPARATUS
11 MOVEMENT DETECTOR
12 TRACKER
13 AREA MANAGER
14 PATROL MONITOR
2 IMAGE INPUT PORTION
3 MONITORING REGION
31, 32, 33 PRESET POSITION
34, 35 ADAPTIVE PRESET POSITION
36 PRESET DISAPPROVAL AREA
37 ADAPTIVE PRESET POSITION DISAPPROVED TO BE REGISTERED

BEST MODE FOR CARRYING OUT THE INVENTION

The present embodiment shows a configuration example of a moving object automatic tracking apparatus used in a monitoring system for monitoring a predetermined region. Particularly, a management method of a photography area in the moving object automatic tracking apparatus will be described in detail.

(First Embodiment)

Figure 1:
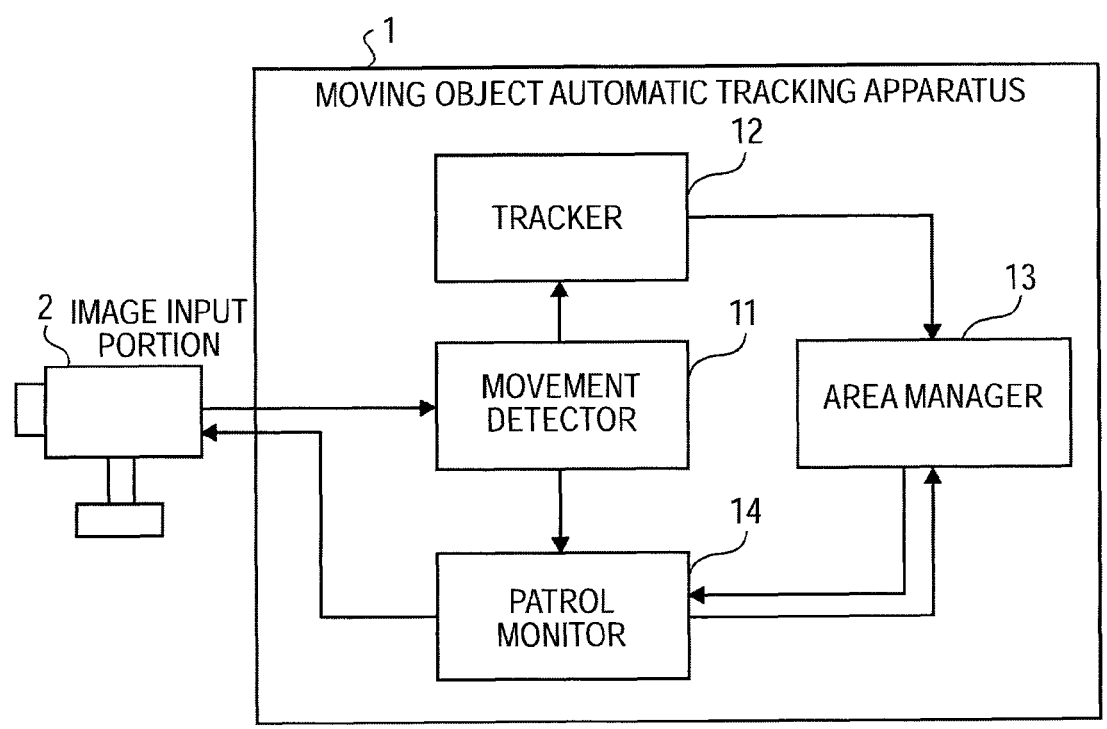
FIG. 1 is a block diagram showing a configuration of a moving object automatic tracking apparatus according to an embodiment of the invention.

FIG. 1 is a block diagram showing a configuration of a moving object automatic tracking apparatus according to an embodiment of the invention.

A moving object automatic tracking apparatus 1 of the present embodiment is connected to an image input portion 2 constructed of a camera etc. with a platform capable of controlling a photography direction in a desired direction. This moving object automatic tracking apparatus 1 is configured to have a movement detector 11 for detecting movement of a moving object from an image obtained in time series from the image input portion 2, a tracker 12 for tracking the moving object by controlling a pan/tilt angle of the platform of the image input portion 2 in a direction of movement of the moving object from a movement detection result of the moving object obtained from the movement detector 11, an area manager 13 for managing single or plural registered preset positions or newly registering a preset position indicating a photography direction of the image input portion 2 corresponding to an area for executing tracking by the tracker 12 and movement detection by the movement detector 11, and a patrol monitor 14 for performing control so as to sequentially photograph plural preset positions set and managed by the area manager 13 by the image input portion 2 and monitoring while patrolling between these preset positions.

The movement detector 11 is means for detecting whether or not a moving object intrudes into an image by prescribed movement detection processing from an image inputted from the image input portion 2. The tracker 12 is means for tracking a moving object included in an image imaged by the image input portion 2 by executing prescribed tracking processing based on information about the moving object detected by the movement detector 11. The area manager 13 is means for registering a lost position of tracking (position in which a moving object tracked is lost) or an initially registered preset position which is an area for detecting movement of the moving object and managing order etc. of a preset position of monitoring. The patrol monitor 14 is means for performing control of turning an imager of the image input portion 2 in the next monitored preset position determined by the area manager 13.

Figure 2:
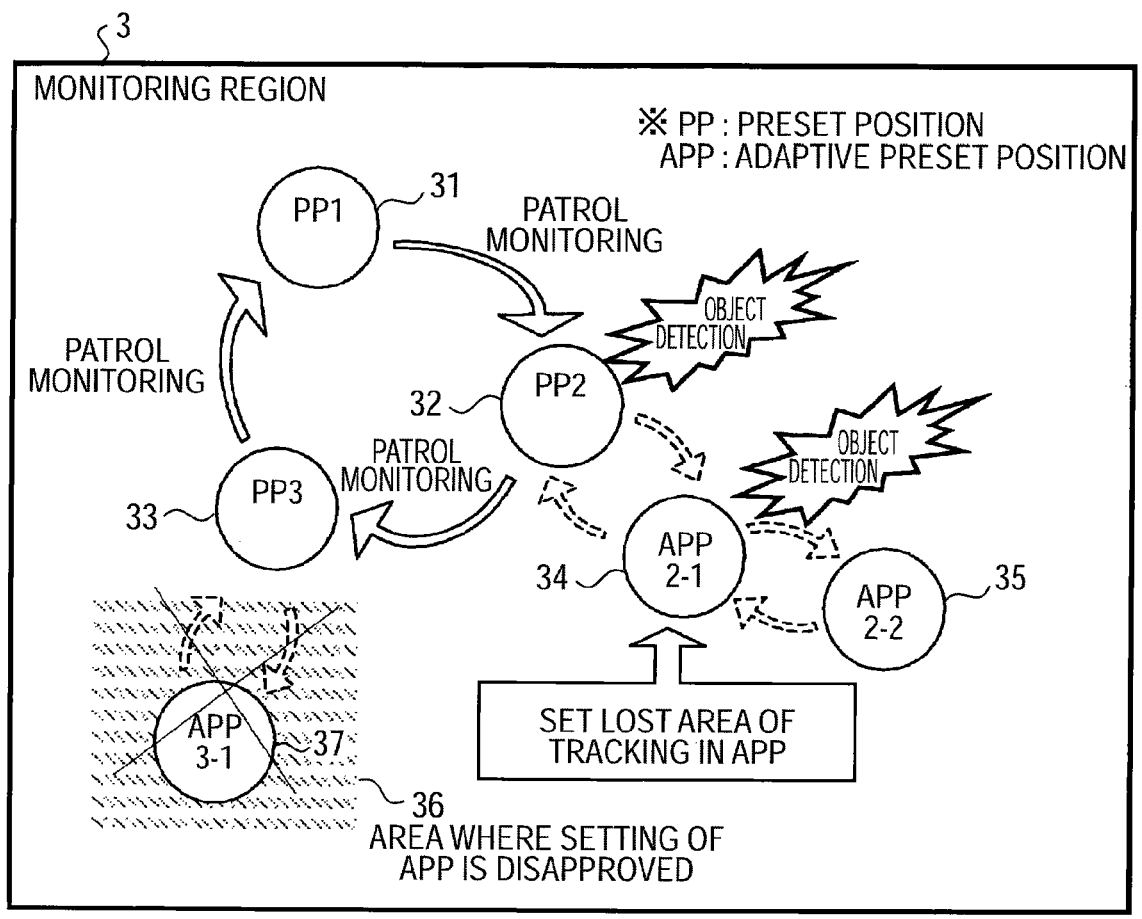
FIG. 2 is an action explanatory diagram related to preset positions of the inside of a monitoring region in the moving object automatic tracking apparatus of the embodiment.
Figure 3:
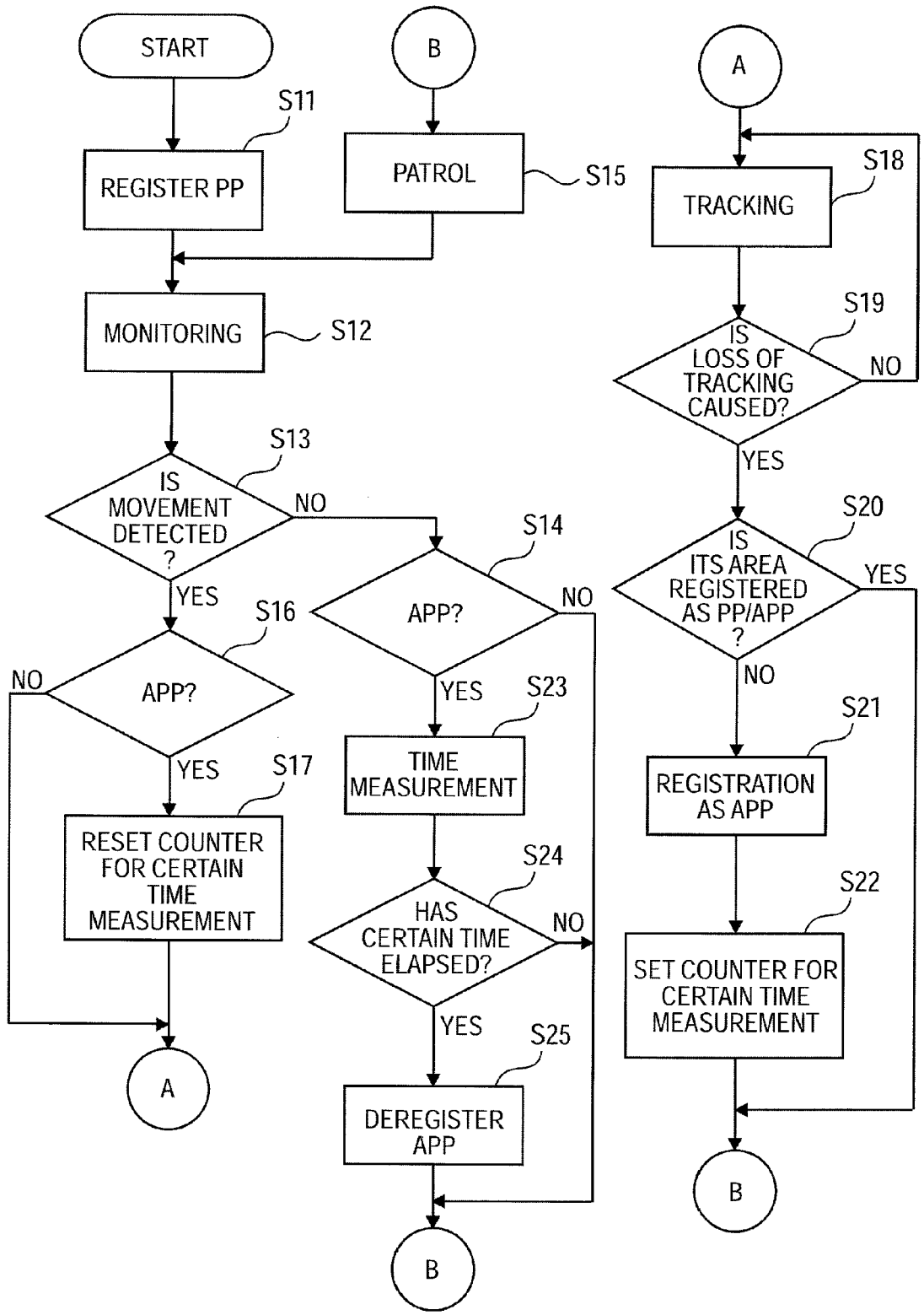
FIG. 3 is a flowchart showing a flow of processing of the moving object automatic tracking apparatus in the embodiment.
Figure 4:
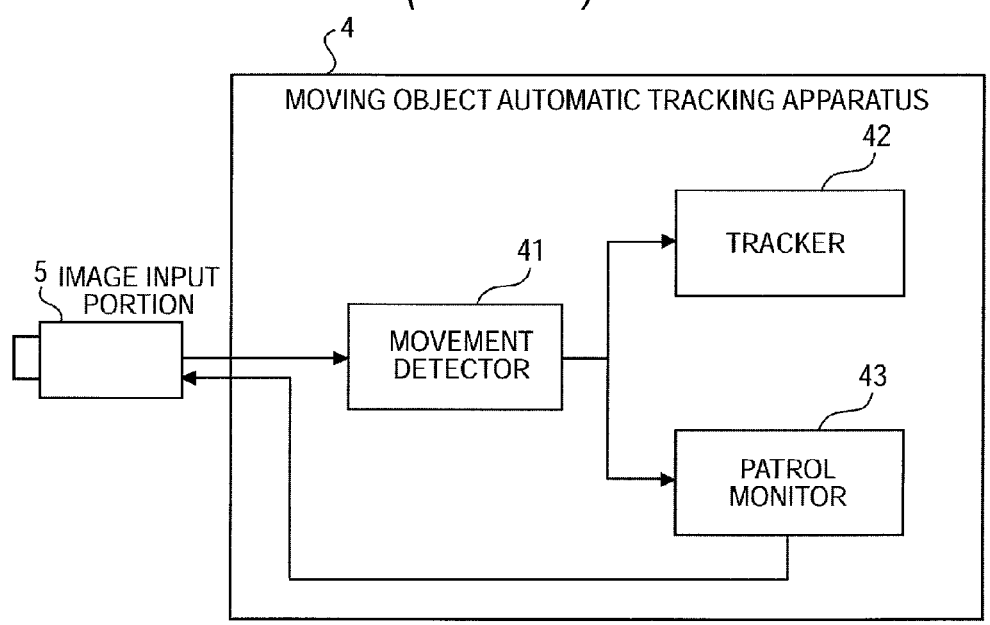
FIG. 4 is a block diagram showing a configuration of a moving object automatic tracking apparatus according to a conventional example.

An action of the moving object automatic tracking apparatus constructed as mentioned above will be described using FIG. 2. FIG. 2 is an action explanatory diagram related to preset positions of the inside of a monitoring region in the moving object automatic tracking apparatus of the embodiment and particularly, an action in the case of registering an adaptive preset position will be described. FIG. 3 is a flowchart showing a flow of processing of the moving object automatic tracking apparatus in the embodiment. In FIGS. 2 and 3, PP disposed in a monitoring region 3 shows a previously registered preset position and APP shows an adaptive preset position additionally registered later. Numerals following PP and APP are numbers for identification.

First, a preset position PP is registered in the area manager 13 (step S11). In an example of FIG. 3, three preset positions of PP1, PP2 and PP3 are registered. Then, based on control of the patrol monitor 14, a photography range of the image input portion 2 is turned in a predetermined preset position and movement of a photography image is detected by the movement detector 11 and a moving object is tracked by the tracker 12 and thereby, monitoring is performed (step S12). The preset position PP1 shall be first monitored.

Next, the patrol monitor 14 decides whether or not movement is detected in the photography image by the movement detector 11 (step S13), and when the movement is not detected, the flowchart proceeds to step S14 subsequently. Here, it is decided whether or not the present monitoring position is an adaptive preset position APP (step S14), and when the position is not the adaptive preset position APP, the position moves in another preset position and the monitoring position is patrolled (step S15). Then, monitoring is performed in step S12. Since the adaptive preset position APP is not registered first, until the moving object is detected, steps S12 to S15 are repeated and the monitoring is performed while patrolling the preset positions 31, 32, 33 of PP1→PP2→PP3→PP1.

When the movement is detected in the photography image in step S13, the flowchart proceeds to step S16 subsequently. Here, the patrol monitor 14 decides whether or not the present monitoring position is the adaptive preset position APP (step S16), and when the position is the adaptive preset position APP, a counter for certain time measurement is reset (step S17) and when the position is not the adaptive preset position APP, step S17 is skipped and the moving object is tracked by the tracker 12 (step S18).

Subsequently, the patrol monitor 14 decides whether or not loss of tracking is caused (the moving object tracked is lost) (step S19), and tracking of step S18 is continued until the loss of tracking is caused. When the loss of tracking is caused in step S19, it is decided whether or not an area of the present monitoring position is registered as the preset position PP or the adaptive preset position APP (step S20), and when the area is registered, the flowchart proceeds to step S15 and patrol is performed so as to move in another preset position and monitoring is performed in step S12.

When the area is not registered as the preset position PP or the adaptive preset position APP in step S20, the patrol monitor 14 registers a peripheral area including a lost position of tracking corresponding to the present monitoring position as an adaptive preset position APP (step S21) and a counter for certain time measurement is set (step S22). Subsequently, the flowchart proceeds to step S15 and patrol is performed so as to move in another preset position and monitoring is performed in step S12.

That is, while patrolling and monitoring the previously registered preset positions 31, 32, 33, a moving object is detected in a preset position and automatic tracking processing of the moving object is executed, with the result that the moving object shall be lost (lost) for some reason. When its lost area differs from the already registered preset positions 31, 32, 33, the lost area is temporarily registered in the area manager as an adaptive preset position 34. This registered adaptive preset position 34 is handled in a manner similar to the registered preset positions 31, 32, 33, and patrol monitoring in which the adaptive preset position 34 is added to the registered preset positions 31, 32, 33 is resumed.

On the other hand, when the movement is not detected in the photography image in step S13 and the present monitoring position is the adaptive preset position APP in step S14, the patrol monitor 14 makes a time measurement by the counter for certain time measurement (step S23) and decides whether or not a certain time has elapsed (step S24), and when the certain time has elapsed, the adaptive preset position APP is deregistered (step S25). Subsequently, the flowchart proceeds to step S15 and patrol is performed so as to move in another preset position and monitoring is performed in step S12.

That is, when the moving object is not detected in the temporarily registered adaptive preset position 34 predetermined times or more after the certain time has elapsed, its adaptive preset position 34 is deregistered and patrol monitoring excluding the deregistered adaptive preset position 34 is resumed. The cases where a moving object such as a person in tracking enters the inside of a vehicle or a building or gets under cover are considered as a factor in losing the moving object in tracking.

In the first embodiment as described above, when a moving object intrudes into an area other than an initially registered preset position, a lost position of tracking is registered as an adaptive preset position by the area manager 13. Consequently, even when the moving object intrudes into the area (area registered as the adaptive preset position) other than the initially registered preset position, movement of the moving object can be detected and tracked.

In addition, in the embodiment, the area manager 13 is constructed so as to deregister the adaptive preset position 34 unless a moving object is detected in the registered adaptive preset position 34 predetermined times or more before a certain time has elapsed after the adaptive preset position 34 is registered in the example of FIG. 2. However, when the moving object is detected in the adaptive preset position 34 before the certain time has elapsed, the moving object detected therein is tracked and a lost area may be added and registered as an adaptive preset position 35 further. By constructing the area manager 13 thus, a detection escape of the moving object can be reduced and a probability of covering all the areas in which the moving object tends to appear can be increased.

The area manager 13 is constructed so as to deregister the adaptive preset position 34 when a moving object is not detected in the area even when a certain time has elapsed after the adaptive preset position 34 is registered in the example of FIG. 2, but a parameter such as time for determining whether or not to deregister the adaptive preset position 34 according to frequency of detecting the moving object in its adaptive preset position 34 may be changed. By constructing the area manager 13 thus, when the moving object is frequently in the area in which the adaptive preset position 34 is registered, a longer period can be registered as the adaptive preset position 34 and a monitoring area can be managed according to an appearance ratio of the moving object.

In the example of FIG. 2, the area manager 13 is constructed so as to be registered as the adaptive preset position 34 when a moving object is tracked and a lost area is an area different from the registered preset positions 31, 32, 33. However, it may be constructed so that an adaptive preset position 37 cannot be newly registered in a preset disapproval area 36 set in an area where setting of the adaptive preset position APP is disapproved even in the case of loss of tracking in a place other than the fixed preset positions 31, 32, 33. By being constructed so that the preset disapproval area 36 where the preset position is disapproved to be registered can be set thus, in the case of loss of tracking in an area in which movement cannot be detected due to influence such as noise, setting can be made so as not to be registered as the adaptive preset position 37 and false detection can be reduced.

In the embodiment, the area manager 13 is constructed so as to register the adaptive preset position 34 in an area in which a moving object detected in any of the preset positions 31, 32, 33 is tracked and lost, but the adaptive preset position APP may be registered in any place manually without waiting to detect the moving object in the preset positions 31, 32, 33. By being constructed thus, the portion which a user wants to monitor can be monitored intensively.

All the monitoring positions in which the adaptive preset position is added to the registered preset position are not patrolled simply, and frequency of monitoring the adaptive preset position can also be increased as compared with the registered preset position. Since the last lost position has a high possibility that an object appears again, a possibility of losing sight of the intrusion object can be reduced by monitoring the adaptive preset position more intensively.

In addition, in the embodiment described above, the case of plural registered preset positions is described, but similar processing can also be performed in the case of a single registered preset position.

(Second Embodiment)

A second embodiment is a modified example of the first embodiment described above. In the second embodiment, a patrol order setting portion capable of freely setting and changing order of performing patrol monitoring is disposed in a patrol monitor 14. That is, in the example of FIG. 2, when an adaptive preset position 34 is temporarily registered by an area manager 13 and patrol monitoring in which the adaptive preset position 34 is added to registered preset positions 31, 32, 33 is performed by the patrol monitor 14, order of performing the patrol monitoring of the adaptive preset position 34 can be changed freely.

For example, patrol monitoring shall be performed in a state of setting order of the patrol monitoring of the newly registered adaptive preset position 34 in the order next to the preset position 32 in which a moving object is detected last before this adaptive preset position 34 is registered. The adaptive preset position 34 shall be handled in a manner similar to the other preset positions 31, 32, 33.

By setting order of patrolling the adaptive preset position 34 in the order next to the preset position 32 in which the movement is detected just before the adaptive preset position 34 is registered thus, a history of positions in which the movement of the moving object is detected is traced and a locus of movement of the moving object can be tracked.

In the second embodiment described above, order of monitoring of the preset position including the adaptive preset position can be changed according to the cases, so that a locus of detection of a moving object detected can be traced or a ratio at which all the preset positions are monitored can be equalized or a place with large movement detection can be monitored intensively. Therefore, proper monitoring of the moving object according to a situation of an area targeted for monitoring can be performed.

According to the moving object automatic tracking apparatus of the embodiment as described above, even when a moving object intrudes into an area other than an initially registered preset position, its area is registered as an adaptive preset position and thereby, movement of the moving object can be detected and tracked in the preset position or the adaptive preset position. Consequently, a position with a high probability of reappearance or a position in which the moving object tends to be lost in addition to the initialized preset position can be monitored and monitoring capability can be improved. The preset position in which the moving object is monitored can be set and released arbitrarily according to a tracking situation or a movement situation of the moving object, so that the number of installations of a camera can be reduced. This moving object automatic tracking apparatus is useful as a security apparatus of an urban area, important facilities, etc.

In addition, the invention is not limited to the embodiments described above, and the invention is also intended to be changed and applied by those skilled in the art based on a well-known technique and mention of the description, and it is included in the scope of protection.

The invention has been described in detail with reference to the specific embodiments, but it is apparent to those skilled in the art that various changes or modifications can be made without departing from the spirit and scope of the invention.

The present application is based on Japanese patent application (patent application No. 2006-258830) filed on Sep. 25, 2006, and the contents of the patent application are hereby incorporated by reference.

Industrial Applicability

The invention has an effect capable of detecting and tracking movement of a moving object even when the moving object intrudes into an area other than an initially registered preset position, and is useful in a moving object automatic tracking apparatus etc. which are used for monitoring applications etc. and have a function of detecting the moving object and automatically tracking the moving object.

The invention claimed is:

1. A moving object automatic tracking apparatus comprising:
an image input portion supported by an adjustable platform, wherein the image input portion captures a moving object in an image;
a movement detector which detects movement of the moving object in the image obtained from the image input portion that controls a photography direction;
a tracker which tracks the moving object by controlling the photography direction of the image input portion in a direction of movement of the moving object based on a detection result of the movement detector;
an area manager that:
manages a plurality of previously-registered preset positions that each correspond to a different photography direction of the image input portion to be repeatedly established before the movement of the moving object is detected to monitor the plurality of preset positions, and also adaptively registers and manages an adaptive preset position corresponding to another photography direction, different than the each of the different photography directions, that is to be repeatedly established in addition to the previously-registered preset positions for monitoring the adaptive preset position in response to detection of the moving object; and
a patrol monitor for patrolling and monitoring the preset position.

2. The moving object automatic tracking apparatus according to claim 1, wherein the area manager registers a peripheral area including a lost position of tracking as the adaptive preset position when the moving object moves to an area other than the initially registered preset position and is tracked and lost.

3. The moving object automatic tracking apparatus according to claim 2, wherein the area manager deregisters the adaptive preset position when the moving object is not detected in an area of the adaptive preset position when a predetermined time has elapsed after the adaptive preset position is registered.

4. The moving object automatic tracking apparatus according to claim 3, wherein the predetermined time is determined as a function of a frequency at which the movement of the moving object is detected at the adaptive preset position.

5. The moving object automatic tracking apparatus according to claim 2, wherein the area manager sets a preset disapproval area where setting of the adaptive preset position is disapproved, and manages registration of the preset position.

6. The moving object automatic tracking apparatus according to claim 1, wherein the patrol monitor includes a patrol order setting portion for setting and changing an order in which the different photography directions are established.

7. The moving object automatic tracking apparatus according to claim 1, wherein the adaptive preset position is a location where the movement of the moving object is detected.

8. The moving object automatic tracking apparatus according to claim 1, wherein a frequency at which the another photography direction corresponding to the adaptive preset position is established is greater than a second frequency at which one or more of the different photography directions corresponding to the adaptive preset positions is established.

9. A moving object automatic tracking apparatus comprising:
an image input portion supported by an adjustable platform, wherein the image input portion captures a moving object in an image;
a movement detector which detects movement of the moving object in the image obtained from the image input portion that controls a photography direction;
a tracker which tracks the moving object by controlling the photography direction of the image input portion in a direction of movement of the moving object based on a detection result of the movement detector;
an area manager which adaptively registers a preset position, and manages a registered preset position, the present position indicating an area for performing tracking and movement detection of the moving object, wherein the area manager registers a peripheral area including a lost position of tracking as the adaptive preset position when the moving object moves to an area other than the initially registered preset position and is tracked and lost; and
a patrol monitor for patrolling and monitoring the preset position.

10. The moving object automatic tracking apparatus according to claim 9, wherein the adaptive preset position is deregistered when a predetermined time has elapsed after the adaptive preset position is registered.

* * * * *